United States Patent [19]

Dundas et al.

[11] Patent Number: 5,022,544

[45] Date of Patent: Jun. 11, 1991

[54] SEALED BOTTLE

[75] Inventors: Dennis L. Dundas, Dover; Eugene L. Moore; Paul M. Oles, both of York; Milton Briggs, Dallastown, all of Pa.

[73] Assignee: Graham Engineering Corporation, York, Pa.

[21] Appl. No.: 423,056

[22] Filed: Oct. 18, 1989

Related U.S. Application Data

[62] Division of Ser. No. 382,775, Jul. 19, 1989, Pat. No. 4,948,356.

[51] Int. Cl.⁵ .............................................. B65D 1/02
[52] U.S. Cl. ..................................... 215/31; 215/1 C; 215/200
[58] Field of Search .................. 215/1 C, 31, 32, 6, 215/100 R, 200, 204; 206/528, 532, 0.6, 0.7

[56] References Cited

U.S. PATENT DOCUMENTS

| | | | |
|---|---|---|---|
| 2,397,051 | 3/1946 | Scherer | 206/528 X |
| 3,198,861 | 8/1965 | Marvel | 215/1 C |
| 3,325,031 | 6/1967 | Singier | 215/1 C X |
| 3,356,244 | 12/1967 | Witchell | 215/32 |
| 3,369,690 | 2/1968 | Hayes | 215/100 |
| 3,423,495 | 1/1969 | Bachner | 264/96 |
| 3,464,085 | 9/1969 | Burkett et al. | 18/5 |
| 3,687,593 | 8/1972 | Gilbert | 215/100 R X |
| 3,765,144 | 10/1973 | Schiesser | 53/39 |
| 3,814,783 | 6/1974 | Dardaine et al. | 264/89 |
| 3,851,029 | 11/1974 | Cornett, III et al. | 215/1 C X |
| 3,861,846 | 1/1975 | Berry | 425/305 |
| 3,957,168 | 5/1976 | Shine et al. | 215/31 X |
| 4,026,982 | 5/1977 | Dardaine et al. | 264/89 |
| 4,052,986 | 10/1977 | Scaife | 128/260 |
| 4,174,238 | 11/1979 | Fowles et al. | 215/1 C X |
| 4,178,976 | 12/1979 | Weiler et al. | 150/0.5 |
| 4,266,927 | 5/1981 | Gilbert et al. | 425/526 |
| 4,401,423 | 8/1983 | Bellehache et al. | 425/210 |
| 4,425,090 | 1/1984 | Hansen | 425/503 |
| 4,510,115 | 4/1985 | Gokcen et al. | 264/515 |
| 4,540,542 | 9/1985 | Weiler | 264/524 |
| 4,574,965 | 3/1986 | Meierhoefer | 215/32 |
| 4,671,763 | 6/1987 | Weiler | 425/525 |
| 4,707,966 | 11/1987 | Weiler et al. | 53/410 |
| 4,787,536 | 11/1988 | Widerstrom | 206/532 X |
| 4,790,117 | 12/1988 | Hansen | 53/410 |

FOREIGN PATENT DOCUMENTS 1566102 5/1969 France.
2042538 2/1971 France.

Primary Examiner—Sue A. Weaver
Attorney, Agent, or Firm—Thomas Hooker

[57] ABSTRACT

A blow molding apparatus including a pair of mold halves, a sealing blade mounted in one mold half and extendable into the mold cavity to seal the blown bottle, a drive member and an angled force multiplying drive connecting the drive member and blade is used in a method to produce a molded sealed bottle.

13 Claims, 5 Drawing Sheets

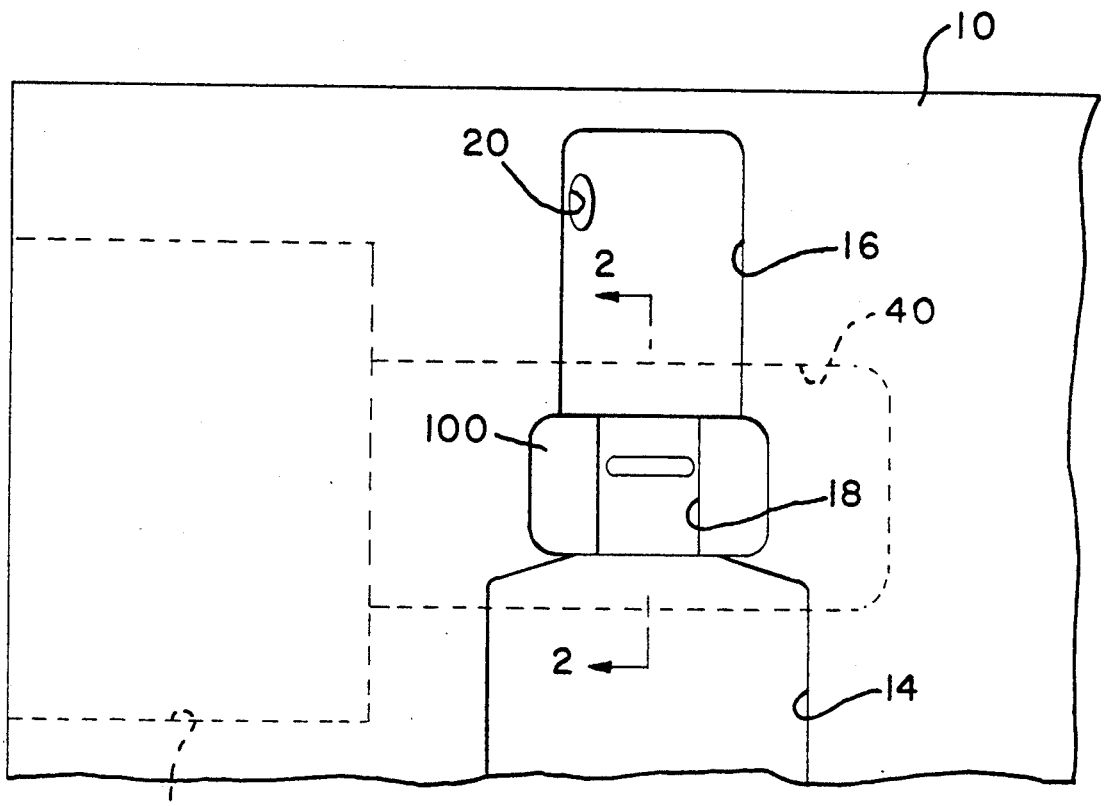
FIG. 1
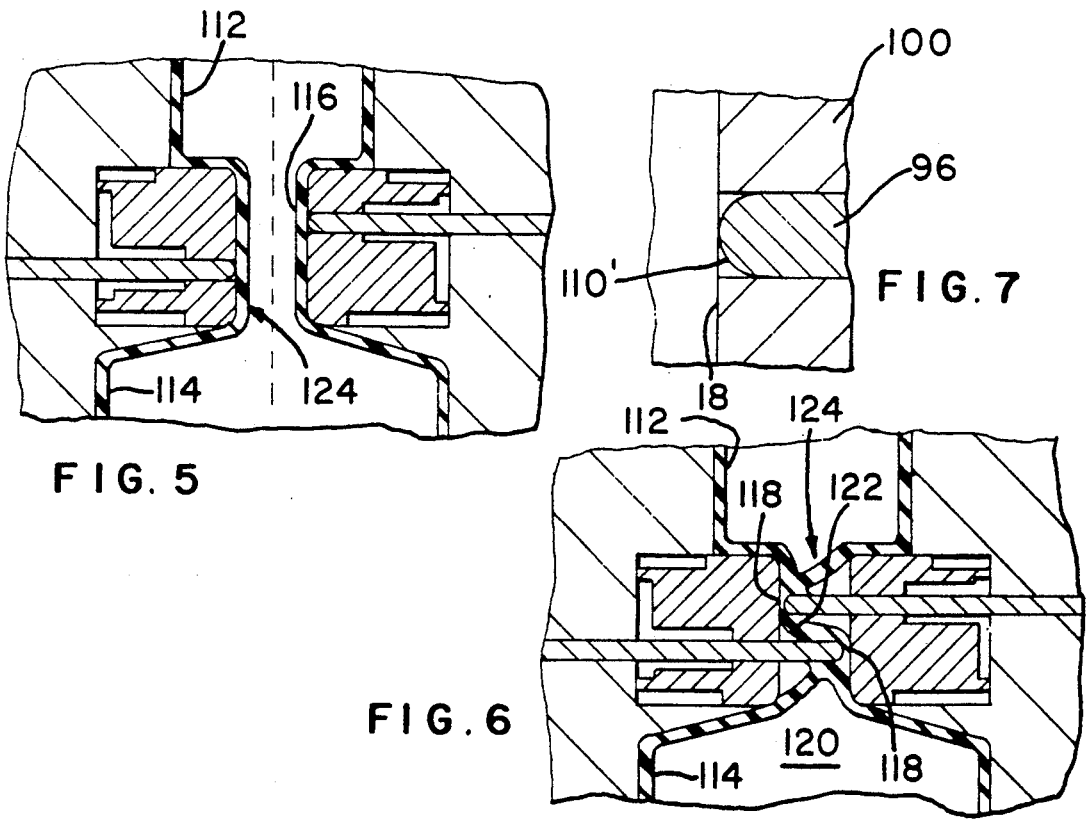
FIG. 5
FIG. 7
FIG. 6

SEALED BOTTLE

This is a division, of application Ser. No. 382,775, filed July 19, 1989, U.S. Pat. No. 4,948,356.

BACKGROUND OF THE INVENTION

This invention relates to sealed, molded thermoplastic resin bottles.

1. Description of the Prior Art

It is conventional to blow mold thermoplastic resin bottles and seal the bottles closed prior to ejection from the mold. The bottles may be sealed empty or after they have been filled, commonly with a liquid. Sealed bottles may be blown using sterile blow air so that the sealed interior is kept aseptic and there is no need to sterilize the interior of the bottles prior to filling. Bottles of this type are used to package food products, medical supplies, blood and other contents requiring sterile packaging.

2. Summary of the Invention

The sealing tooling of the present invention is used in a blow molding machine and provides reliable triple redundant seals closing the interior of a blow molded thermoplastic resin bottle, preferably blown using sterile air with a sterile interior. The triple seal maintains the sterility of the interior of the bottle, despite the risk that an individual seal may fail.

Other objects and features of the invention will become apparent as the description proceeds, especially when taken in conjunction with the accompanying drawings illustrating the invention, of which there are four sheets and one embodiment.

DESCRIPTION OF THE DRAWINGS

FIG. 1 is a plan view of the top of a mold half used for blow molding a molded bottle according to the invention;

FIGS. 5 and 6 illustrate a bottle blown between the mold halves before sealing and after sealing respectively;

FIG. 7 is an enlarged view illustrating the retracted position of one sealing blade.

DESCRIPTION OF THE PREFERRED EMBODIMENT

Figure 2:
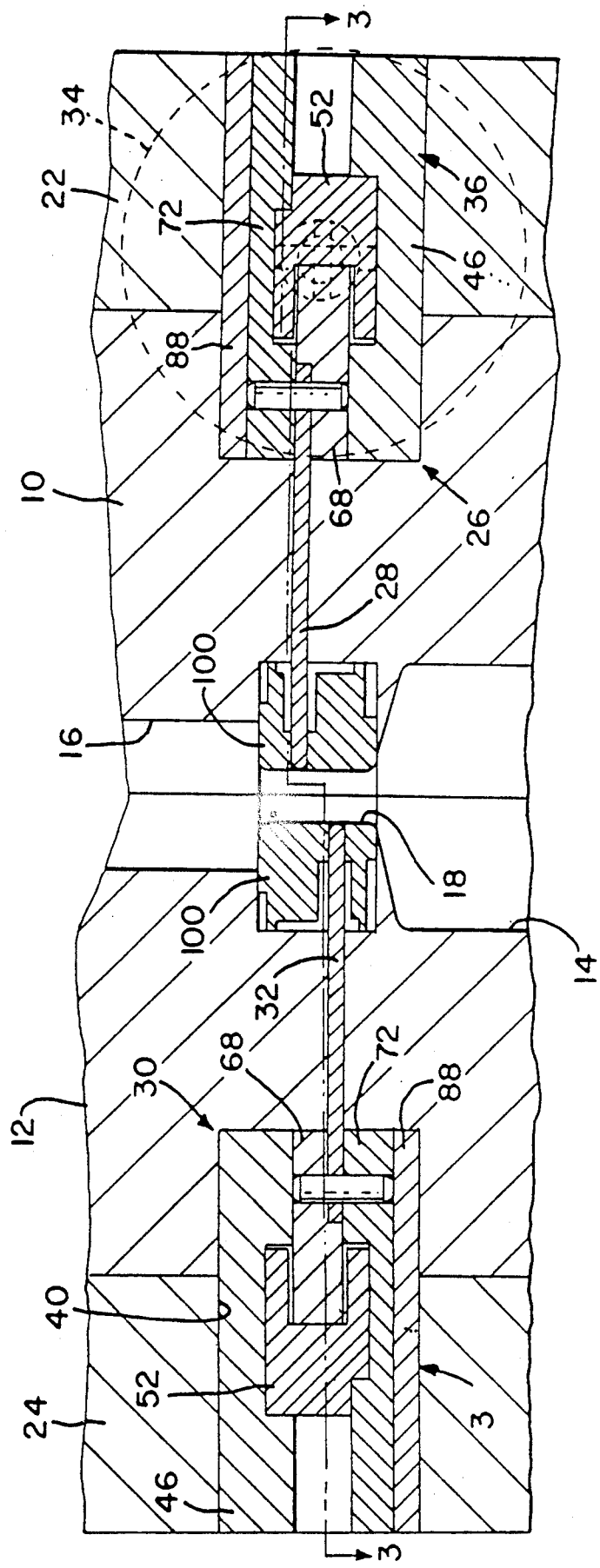
FIG. 2 is a sectional view taken along line 2—2 of FIG. 1 showing the mold halves closed.

The drawings illustrate a pair of complimentary blow mold halves 10 and 12 of a blow molding machine (not illustrated). The mold halves when closed define bottle recess 14, blow dome recess 16 and reduced area rectangular seal neck 18 connecting recesses 14 and 16. A blow needle (not illustrated) is mounted in mold half 10 and extends into the blow dome recess through opening 20. The mold halves 10 and 12 are mounted on supporting plates or platens 22 and 24. In turn the plates 22 and 24 are connected to a drive for opening and closing the mold halves as required during the blow molding operation. The blow molding machine includes an extruder for flowing a molten thermoplastic resin parison between the mold halves when open. The plastic in the parison may be a high density polyethylene resin although other resins, or even co-extruded resins, may be used as desired.

Right angle parison sealing tooling 26 is mounted in mold half 10 and supporting plate 22, and includes a flat sealing blade 28 extendable across the seal neck 18 for sealing the portion of the parison confined within the neck. A second right angle parison sealing tooling 30, identical to tooling 26, is mounted in mold 12 and plate 24 and includes a sealing blade 32 like blade 28 also extendable into and across the seal neck for sealing the parison confined within the neck. Blades 28 and 32 are spaced apart along the seal neck to assure that each blade forms an independent parison seal.

Figure 3:
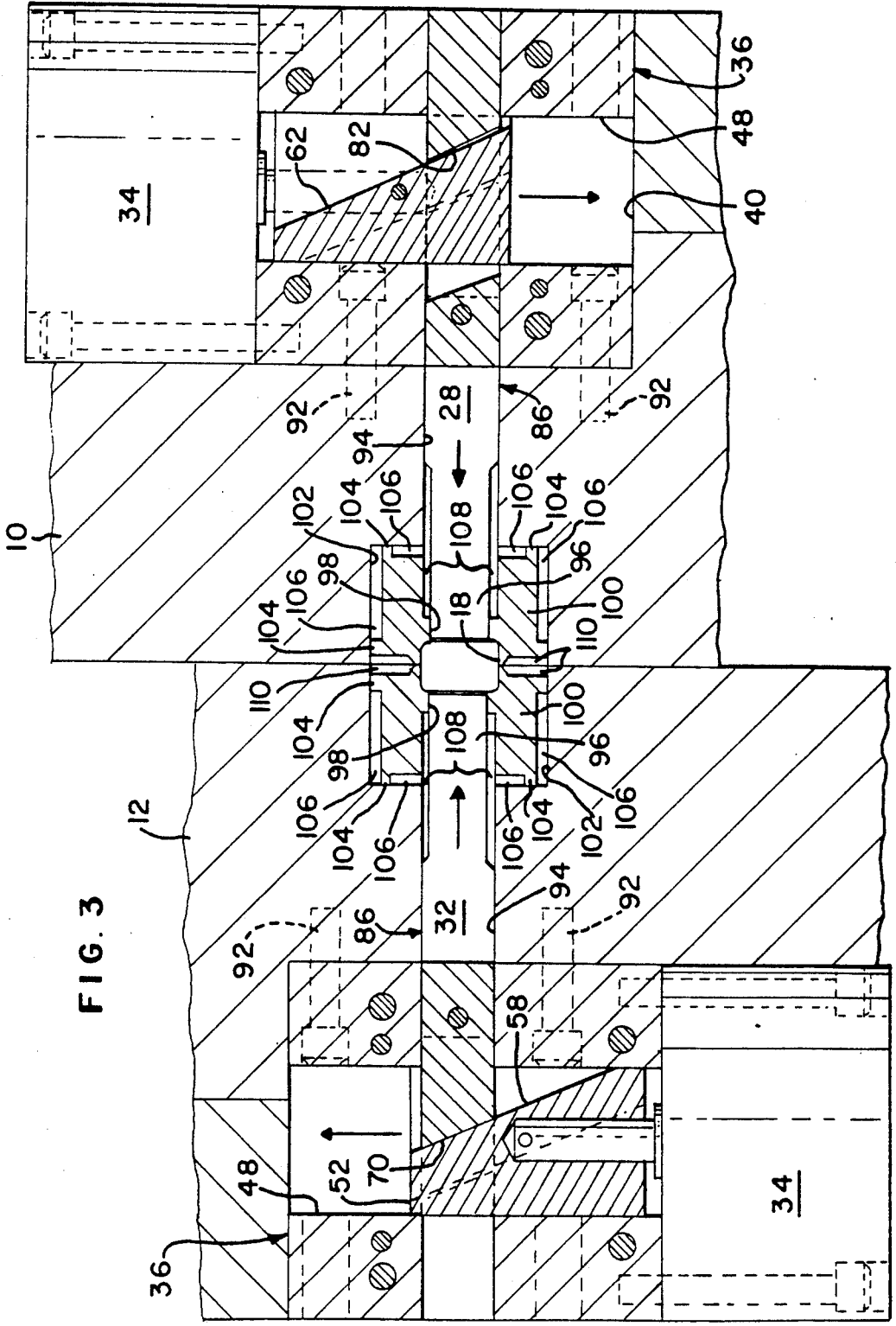
FIG. 3 is a sectional view taken along line 3—3 of FIG. 2.

Each sealing tooling includes an air cylinder 34 and a flat right angle force-multiplying drive 36 connecting the piston rod of cylinder 34 to the respective blade 28, 32. Cylinders 34 are confined within recesses 38 formed in the mold half and adjacent plate and each connection 36 is located within a flat recess 40 likewise formed in the mold half and adjacent plate. The recesses 38 and 40 are as indicated generally in FIG. 1 and as illustrated in FIG. 3, extend to the opposite sides of the mold halves. The two sets of sealing tooling 30 and 36 are identical. Sealing blades 28 and 32 are located to one side of the center of the drive connections 36 so that they are located at different levels in the seal neck while the recesses 38 and 40 in the mold halves are at the same level.

Figure 4:
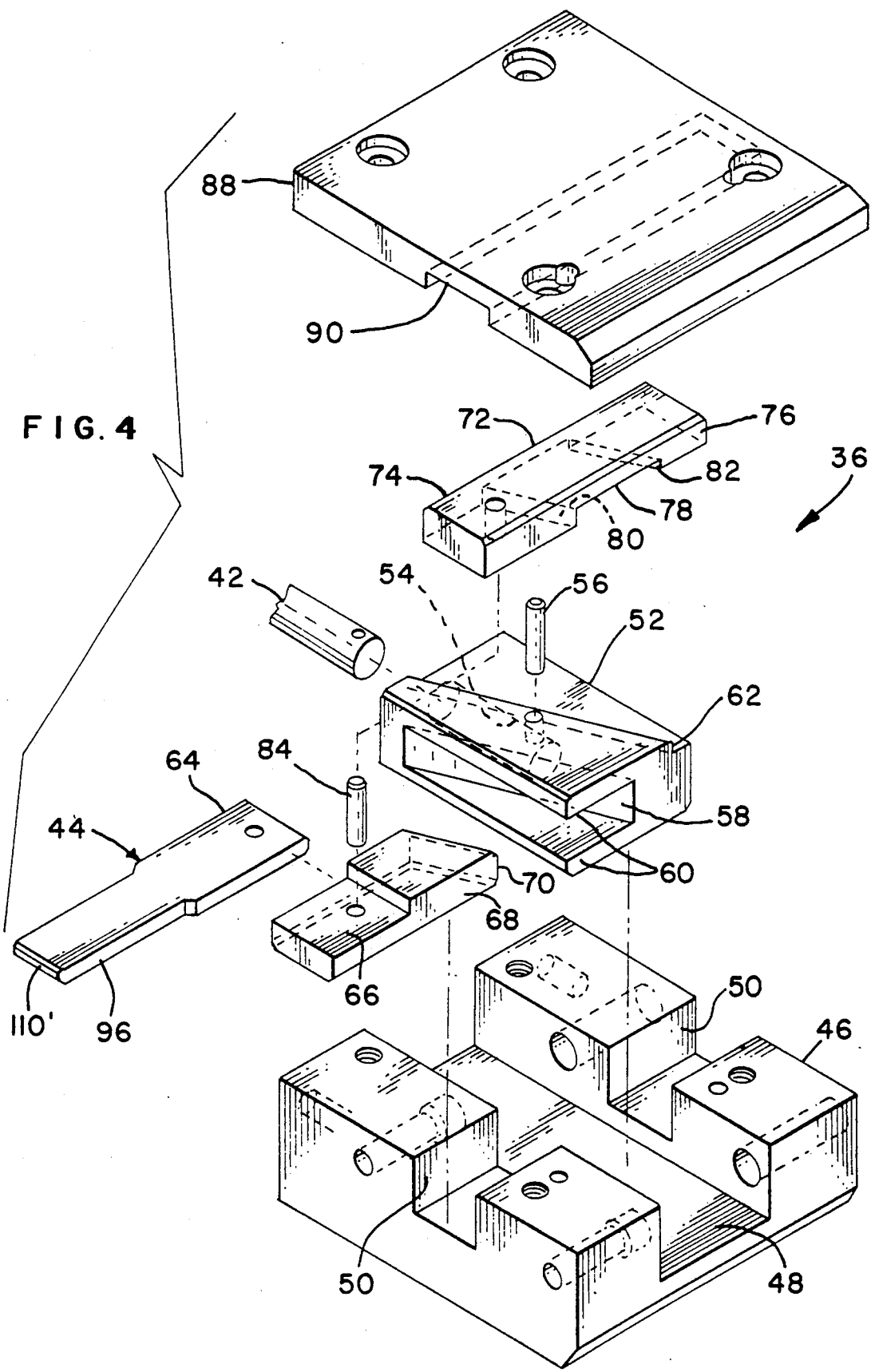
FIG. 4 is an exploded view of the right angle drive connection for the sealing tooling.
Figure 8:
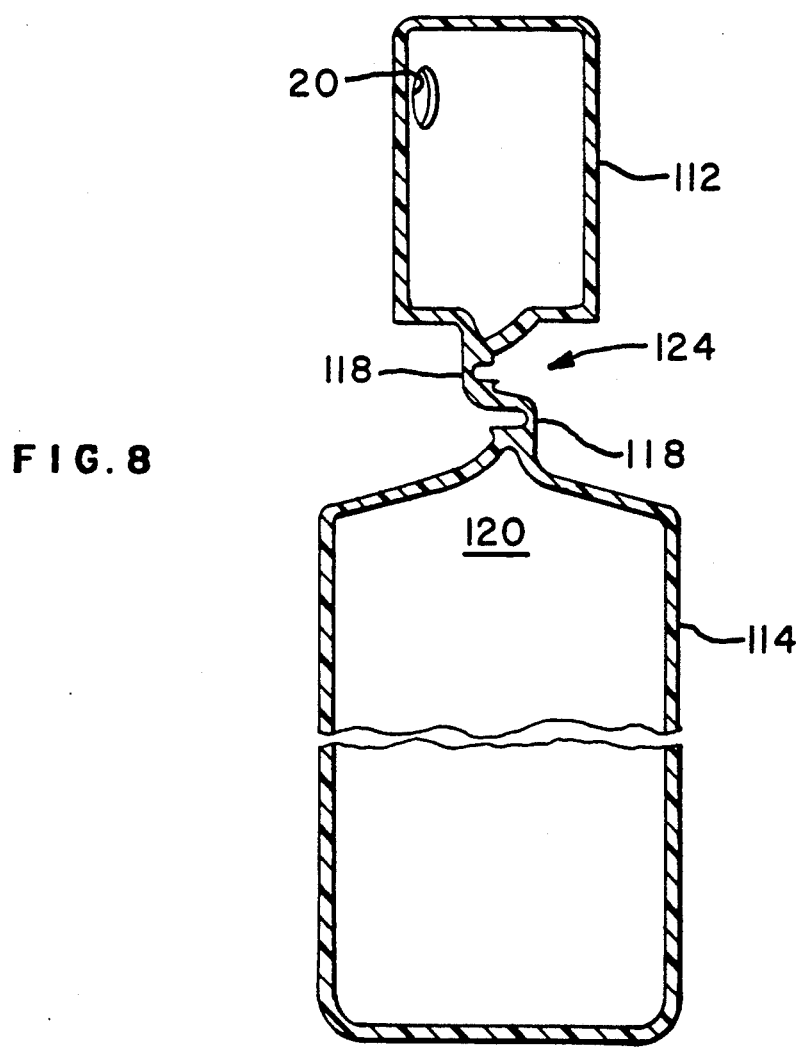
FIG. 8 is a vertical sectional view taken through the blown and sealed bottle.

FIG. 4 is an exploded view illustrating a right angle drive connection 36, piston rod 42 of a cylinder 34 and one of the sealing blades 26, 32, identified by reference number 44. The drive connection 36 includes a rectangular guide block 46 including a central wedge block slot 48 and a shallow sealing slide slot 50 extending perpendicular to and to either side of slot 48. Rectangular wedge block 52 is slidingly fitted in slot 48. The end of the piston rod 42 is fitted within bore 54 extending into one end of block 52 and is secured to the block by pin 56. A flat angled drive cam surface 58 is formed on the side of block 52 adjacent blade 44, to either side of guide walls 60. Walls 60 align the block in slot 48 during extension and retraction strokes. A flat angled return surface 62 extends across the top of block 52 parallel to drive cam surface 58.

The end 64 of sealing blade 44 remote from seal neck 18 is fitted within notch 66 in cross slide 68. The slide carries an angled cam follower surface 70 having the same slope as surfaces 58 and 62. Return plate 72 includes a thick end 74, thin end 76 and a angled slot 78 between the ends defined by wide angled slide surface 80 adjacent end 74 and angled narrow return follower surface 82 adjacent thin end 76. All of surfaces 58, 62, 70 and 82 extend at the same angle and are parallel when the drive connection is assembled. Thick end 74 of the return plate is positioned above end 64 of blade 44 and slide 68. The blade, plate and slide ar secured together unitarily by pin 84 fitted in suitable bores in the respective members as illustrated. When assembled, the blade 44, slide 68 and plate 72 form a blade assembly 86 with the free end of the slide extending into the wedge block 52 between guide walls 60 and with the follower surface 70 flush on the parallel drive cam surface 58. The return plate extends along the adjacent side of the wedge block with the narrow return follower surface 82 located adjacent and parallel to the return cam surface 62. Wedge block 52 is fitted within slot 48 with the blade assembly 86 fitted in slide slot 50 extending transversely to slot 48. Cover plate 88 is mounted on top of the guide block 46 by suitable guide pins and cap screws and includes slot 90 slidably receiving the top of the return plate 72.

FIGS. 2 and 3 illustrate the positions of the drive connections 36 in the mold halves and plates. Recesses 38 and 40 open to the back surface of the respective plates 22 and 24 thereby permitting mounting of the cylinders and drive connections to the mold halves by suitable cap screws 92 illustrated in FIG. 3. Sealing blades 28 and 32 are fitted in slide guides 94 formed in the mold halves. The ends 96 of flat blades 28 and 32 are reduced in width and extend through complimentary slide guides 98 of heat retention inserts 100 carried by the mold halves 10 and 12. Inserts 100 are fitted in complimentary recesses 102 formed in mold halves 10 and 12 and define the rectangular seal neck 18. Contact ridges 104 on the outer surfaces of the inserts 100 locate the inserts in recesses 102 and cooperate to define air gaps 108 between the inserts and the mold halves. The air gaps extend substantially around the majority of the surface area of the inserts and may have a depth of approximately 0.030 inch. These gaps limit the flow of heat from the inserts to the cooled mold halves. The mold halves 10 and 12 are conventionally manufactured from conductive aluminum and include internal cooling channels (not illustrated) for maintaining the molds at the relatively low temperature required to set the plastic following blow molding. The inserts 100 are made of a relatively nonconductive material, such as titanium, to reduce cooling of the plastic confined in the seal neck 18. The ends 96 of sealing blades 28 and 32 are surrounded by circumferential air gaps 108 from the end of the short length slide bore 98 a distance away from the seal neck 18 until the width of the blades increase. This gap further reduces heat transfer from the ends of the blades to the cool mold halves. Flash recesses 110 are provided in the faces of inserts 100 to either side of the recesses 18. See FIG. 3.

The sealing tips 110' of blades 28 and 32 are smoothly rounded along the width of the seal neck as illustrated in FIG. 7. When the blades are retraced, the tips are withdrawn flush to the side of the seal neck 18.

Each sealing blade is extended into and retracted from the seal neck recess by extension and retraction of its respective cylinder 34. With the cylinder 34 in the retracted position, as shown in FIGS. 2 and 3, the blades are retracted and are tangent to seal neck recesses 18. Extension of the cylinders moves the wedge blocks 52 from the retracted positions shown in FIG. 3 to the ends of the slots 48. Cam surfaces 58 on blocks 52 are moved along the complimentary follower surfaces 70 of the blade assemblies 86 thereby driving the assemblies in a transverse direction away from surface 58 and moving the sealing blades 28 and 32 from their retracted positions of FIG. 3 to the extended positions shown in FIG. 6 where sealing tips 110 are moved across the seal neck 18, and, with full extension of cylinders 34, are located a short distance from the opposite side of the seal neck. The sealing blades are retracted from the extended positions by retracting cylinders 34 so that the return cam surfaces 62 of blocks 52 are brought into engagement with the return follower surfaces 82 of blade assemblies 86 thereby retracting the assemblies and moving the blades back to the retracted position of FIG. 2.

Considerable force is required to extend the sealing blades across the cavity seal neck and form the required welded seals closing the seal neck 124 of the blown bottle. This force is effectively transmitted through the drive connections using wide, large area connections between the wide driving cam surfaces 58 the block and the correspondingly wide follower surfaces 70 on the blade assemblies. Considerably less force is required to retract the sealing blades. This permits use of a relatively smaller area contact between the return cam surfaces 62 on the blocks and the narrow return follower surfaces 82 of the blade assemblies.

Modern blow molding machines have little space available for location of large, high power cylinders or drivers for extending and retracting sealing blades for sealing blow molded bottles. The problem of locating the power drives for the sealing blades is further complicated by the necessity to provide a very high driving force to assure the formation of reliable seals. Right angle drive connections 36 are very compact and are easily mounted in recess 40 without undue disturbance of the cooling channels in mold halves 10 and 12. The right angle connections permit locating of a linear operation, cylinder 34, in recess 38 also located within the backup plates, 22 and 24. This compact drive uses available space and does not extend out of the back of either of the plates 22 and 24.

In addition to transmitting the linear drive force from cylinders 34 through a right angle to drive the sealing blades into and out of the seal neck 18, drive connection 36 use drive cam and follower surfaces having a shallow angle to the drive stroke of cylinder 34, thereby multiplying the extension force of the cylinder 34 by a factor of about 2.4 to increase the sealing force at the blades. The drive correspondingly reduces the stroke of the sealing blades. Cylinders 34 may have a one inch stroke and use line air pressure sufficient to exert a maximum force of about 245 pounds. The drive connections reduce the stroke of the sealing blades to approximately 0.414 inch while increasing the sealing force to approximately 587 pounds. When this force is applied to sealing blades having a cross sectional area of about 0.067 square inch at tip 110' the sealing pressure exerted by the blades on the parison plastic confined in the seal neck is about 8700 pounds per square inch, sufficient to form reliable seals closing the blown article or bottle.

The operation of the sealing tooling 26 will now be described.

At the beginning of the cycle of operation mold halves 10 and 12 are open and cylinders 34 are retracted to retract the sealing blades 28 and 32. A plastic resin parison is positioned between the mold halves in alignment with recesses 14, 16 and 18 and the mold halves are closed on the parison. A blow needle is extended through opening 20 into the blow dome recess to puncture the parison following which blow air, which may be sterile, is flowed through the needle and into the confined parison to inflate the parison against the walls of the mold cavity. Recesses 16 and 14 are cooled by manifolds in the mold halves so that the skin of the inflated hot plastic in the recess is quickly cooled below the set temperature and hardens to form rigid blow dome 112 and bottle 114 shown in FIG. 5. The rectangular tube of plastic 116 confined in the rectangular seal neck 18 is held against the relatively hot, heat retention inserts 100 and is not cooled below the set temperature.

Following reduction of the pressure within the blown plastic body to a desired level, which may be subatmospheric, cylinders 34 are actuated to extend the wedge blocks 52 in both drive connections 36 thereby extending the sealing blades from the retracted position of FIG. 5 across the seal neck 18 to the position of FIG. 6. The tip 110' of each blade forces the adjacent layer of hot, molten and formable plastic across the seal neck and drives the plastic into welded engagement with the layer of hot, molten and formable plastic on the opposite side of the seal neck to weld the two layers together and form a seal 118 extending across the width of the seal neck and closing off the interior 120 of bottle 114. Each blade forms an axially spaced and separate seal 118 as shown in FIG. 6. Further, extension of the blades across the seal neck moves the two layers of the plastic on each side of the seal neck between the blades diagonally across the seal neck and into contact with each other to form a third, independent seal 122 closing the bottle interior 120. This seal extends generally diagonally across the width of the seal neck as illustrated in FIG. 6. The thickness of the parison may be increased at the seal neck to provide additional hot plastic for making the seals.

The blades are maintained extended for a few seconds to assure formation of the seals. After the bottle is sealed cylinders 34 are retracted to retract the sealing blades 28 and 32, the mold halves open and the blown and sealed bottle is ejected.

Extension of the sealing blades forms three independent seals, each of which closes off the interior of the bottle 114. The formation of triple redundant seals is important in volume manufacturing processes because there is always a finite possibility, however small, that an individual seal may fail. The provision of redundant seals reduces the likelihood that for a given bottle all the seals will fail and the bottle will be rejected. This likelihood is a very small number, the product of the probabilities of failure of each individual seal. For practical purposes, provision of a double or triple redundant seal assures that the bottles are effectively sealed.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. A blow molded bottle comprising an integral body of thermoplastic resin, said body having a hollow interior surrounded by an imperforate wall and a seal neck having a longitudinal axis, said seal neck including a pair of spaced apart welded seals joining the plastic forming opposing sides of the seal neck, said seals being axially offset, each seal independently closing the interior of the body.

2. A bottle as in claim 1 wherein said seals are located at spaced locations along the length of the seal neck and are diagonally spaced apart across the seal neck.

3. A bottle as in claim 2 further including a third seal extending diagonally across the seal neck.

4. A bottle as in claim 2 wherein said seal neck includes a third independent seal.

5. A bottle as in claim 4 wherein said third seal is located between said pair of seals.

6. A bottle as in claim 1 wherein the interior of the bottle is sterile.

7. A bottle as in claim 1 including a gas within the hollow interior, said gas having a subatmospheric pressure.

8. A bottle as in claim 1 wherein said integral body includes a blow dome on the end of the seal neck away from the wall.

9. A blow molded bottle comprising an integral body of thermoplastic resin, said body having a hollow interior surrounded by an imperforate wall and a seal neck having a pair of spaced apart welded seals joining the plastic at opposite sides of the seal neck and located at spaced locations along the length of the seal neck, and a third seal located between said pair of seals, each seal independently closing the interior of the body.

10. A bottle as in claim 9 wherein said third seal extends diagonally across the width of the seal neck.

11. A bottle as in claim 9 wherein the interior of the bottle is sterile.

12. A bottle as in claim 11 including a gas within the hollow interior, said gas having a subatmospheric pressure.

13. A bottle as in claim 9 wherein said integral body includes a blow dome on the end of the seal neck away from the wall.

* * * * *